H. B. NEWHALL.
CONDUIT OR CABLE CLAMP AND BRIDLE RING.
APPLICATION FILED JULY 14, 1920.

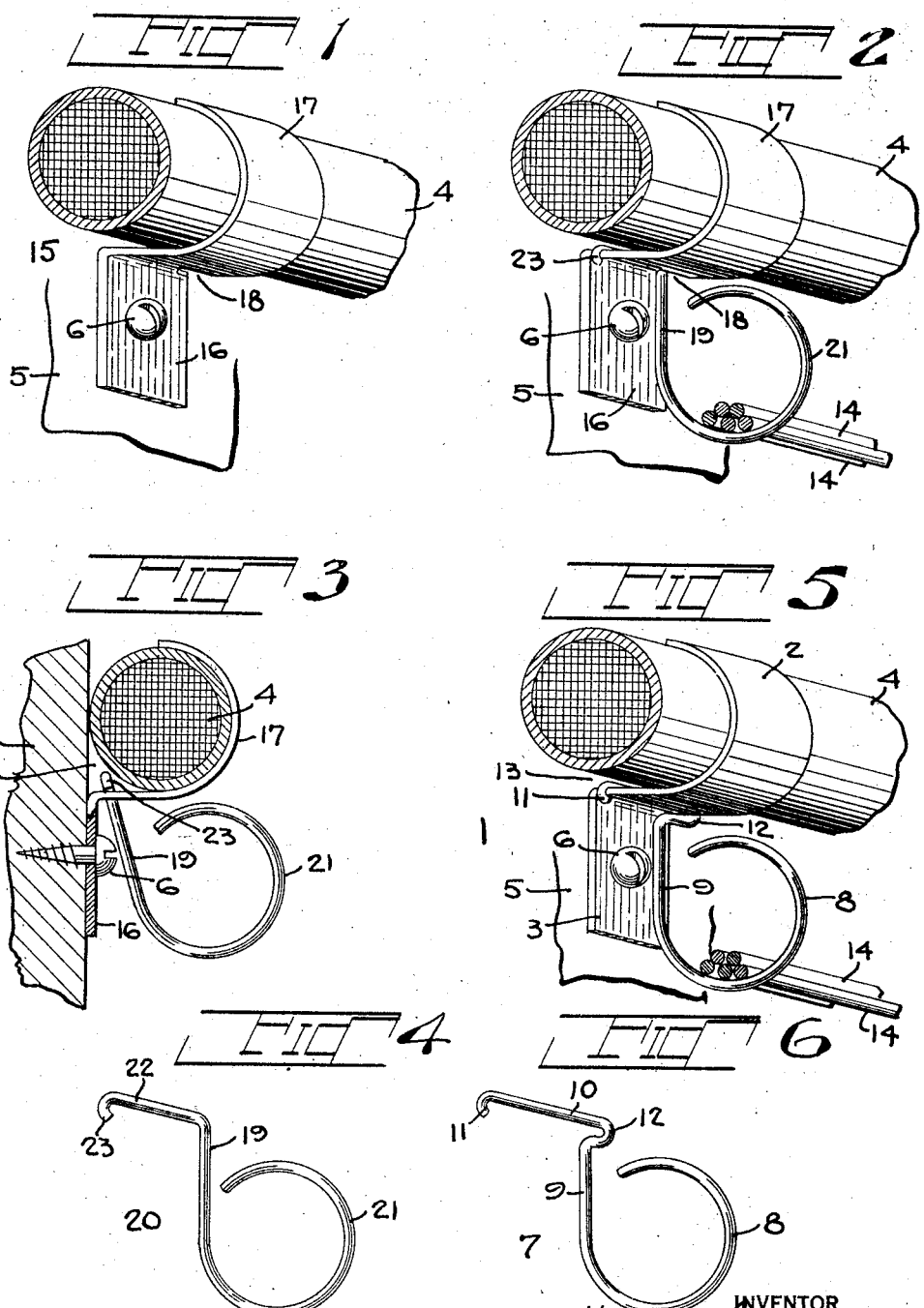

1,365,624.

Patented Jan. 11, 1921.
2 SHEETS—SHEET 2.

INVENTOR
Henry B. Newhall
BY
Charles Johnson
ATTORNEY

UNITED STATES PATENT OFFICE.

HENRY B. NEWHALL, OF PLAINFIELD, NEW JERSEY.

CONDUIT OR CABLE CLAMP AND BRIDLE-RING.

1,365,624.      Specification of Letters Patent.      Patented Jan. 11, 1921.

Application filed July 14, 1920. Serial No. 396,139.

*To all whom it may concern:*

Be it known that I, HENRY B. NEWHALL, a citizen of the United States, resident of Plainfield, in the county of Union and State of New Jersey, have made certain new and useful Improvements in Conduit or Cable Clamps and Bridle-Rings, of which the following is a specification, taken in connection with the accompanying drawings.

My invention relates to the combination of a conduit or cable clamp and a bridle ring, and also to a cable or conduit clamp and a bridle ring as sub-combinations of the main combination, and as articles of manufacture.

My invention further relates to a bridle ring having a horizontal shank which is mounted in the dead space above the hook of a conduit or cable clamp.

My invention further relates to a bridle ring having a horizontal shank which may be employed with any old form of conduit or cable clamp. My invention further relates to a conduit or cable clamp which is provided with a slot to coöperate with a portion of the vertical shank of a bridle ring.

My invention further relates to such a bridle ring which is entirely supported by the hook portion of the conduit or cable clamp. My invention further relates to a bridle ring which is partly supported by the hook portion of the conduit or cable clamp, and partly by the screw which secures the clamp to a wall or other support.

My invention further relates to certain combinations, sub-combinations, articles of manufacture, and details of construction, all of which will be more fully hereinafter described and pointed out in the claims.

In the figures, in which I have shown different embodiments of my invention, but to which I am not to be limited, the same reference numerals refer to similar parts in the several figures.

Figure 1 is a perspective view of a conduit or cable clamp, and a cable, the hook portion of the clamp being provided with a transverse slot;

Fig. 2 is a perspective view similar to Fig. 1, but showing one form of my bridle ring mounted in the dead space of the clamp, the vertical shank of the bridle ring extending through the slot;

Fig. 3 is a vertical section showing the manner of attaching the bridle ring to the clamp;

Fig. 4 is a detail perspective view of the form of bridle ring employed in Figs. 1 and 2;

Fig. 5 is a perspective view of the preferred construction in which the cable or conduit clamp is not provided with a slot;

Fig. 6 is a perspective view of the form of bridle ring having a reverse bend which is employed in the construction shown in Fig. 5;

Figure 7:
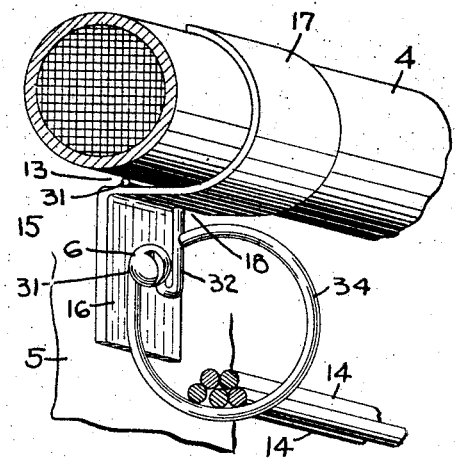
Fig. 7 is a perspective view of a conduit or cable clamp and cable, the hook portion of the conduit clamp being provided with a transverse slot, and a bridle ring which is partly supported by the conduit or cable clamp and partly by the securing screw.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

In the preferred construction shown in Figs. 5 and 6 the conduit or cable clamp 1 is provided with a hook portion 2 and a base 3, and supports a cable 4 against the wall 5 by means of the securing screw 6. This conduit or cable clamp 1 may be of any suitable construction including such conduit or cable clamps as are now in use.

Whenever the traffic load on the cable 4 becomes excessive and the telephone engineers determine to increase the capacity of the installation, this can be readily done by the addition of my bridle ring 7, Fig. 6.

This bridle ring has an open ring 8, a vertical shank 9, a horizontal shank 10, and is preferably provided at one end with a hook 11 and at the other end with a reverse bend 12. From the circular contour of the cable 4 there is always a dead space 13, Figs. 3 and 5, above the hook portion 2 which is not filled by the cable. By my invention it is merely necessary to insert the horizontal shank 10 into this dead space 13, first bringing the vertical shank 9 at an angle to the base 3 as shown in Fig. 3, so as to permit the hook 11 to readily pass through the dead space. By then swinging down on the hook 8, so that the vertical shank 9 lies parallel with the base 3, the hook 11 will overlap and engage the edge of the hook member 2 of the conduit or cable clamp 1. Preferably, though not necessarily, I also provide the bridle ring with a reverse bend 12, Fig. 6, which will engage the other edge of the hook member 2 and prevent any accidental disengagement of the bridle ring from the conduit or cable clamp after it has once been positioned, as shown in Fig. 5. The bridle wires 14, 14 can then be located in the open ring 8 in the usual manner.

In this form of my invention, no particular form of conduit or cable clamp has to be made to coöperate with my bridle ring. Nor is the engagement and disengagement of the bridle ring 7 dependent upon tightening or loosening the securing screw 6.

In Figs. 1, 2, 3 and 4 I have shown a modification in which the conduit or cable clamp 15 is provided with a base 16, a hook portion 17, the hook portion being provided with a transverse slot 18 to coöperate with the vertical shank 19 of the bridle ring 20, Fig. 4. This bridle ring has an open ring 21, a horizontal shank 22, and a hook member 23. It is mounted in the dead space 13, in the same manner as previously described by bringing the vertical portion 19 on an angle to the base 16 as shown in Fig. 3, so as to permit the hook 23 to pass through the dead space. The transverse slot 18 serves to hold the bridle ring 20 in its proper position.

I may in some cases use a bridle ring having a horizontal shank which bridle ring is partly supported by the conduit or cable clamp, and partly by the securing screw, which holds the clamp to the wall or other suitable support.

Figure 8:
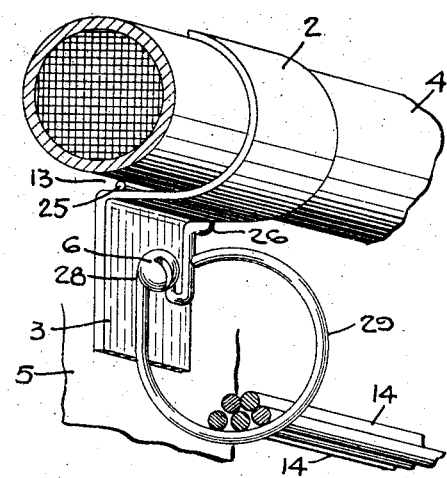
Fig. 8 is a perspective view, similar to Fig. 7, except that the conduit or cable clamp is not provided with a slot, and a different form of bridle ring is employed.
Figure 11:
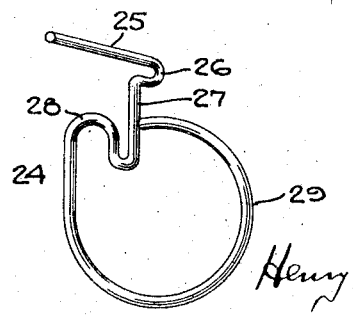
Fig. 11 is a perspective view of the bridle ring shown in Fig. 8.

In Figs. 8 and 11 I have shown a conduit or cable clamp, the same as in Fig. 5, but a different form of bridle ring 24 having a horizontal shank 25, preferably a reverse bend 26, and a shank 27 provided with a bend 28 to fit under the head of the securing screw 6. The shank 27 is continued and forms the open ring 29. In this form of my invention it is not necessary to form the horizontal shank 25 with a hook, such as 11, for its contact with the head of the screw 6 will prevent any accidental disengagement of the bridle ring from the conduit or cable clamp.

In this form of my invention, the bridle ring 24 is partly supported by the hook portion 2 of the conduit or cable clamp and partly by the securing screw 6.

Figure 9:
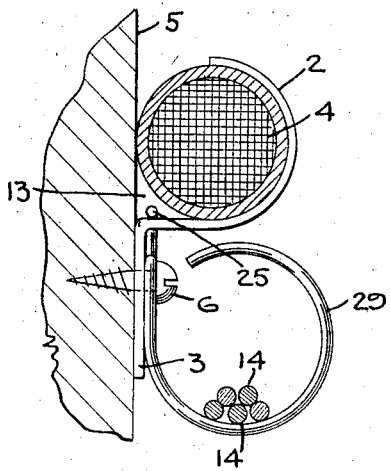
Fig. 9 is a vertical section through the construction shown in Fig. 8.
Figure 10:
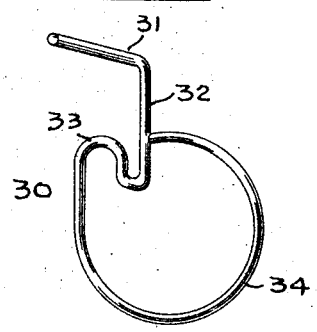
Fig. 10 is a perspective view of the form of bridle ring used with the construction shown in Fig. 7.

I may also use a conduit or cable clamp such as 15 having a base 16, hook portion 17 and slot 18 with my improved bridle ring 30, Figs. 7, 9 and 10. In this form of my invention the bridle ring is provided with a horizontal shank 31, a vertical shank 32, a bend or bow 33, to fit over the securing screw 6, and with the open ring 34. The horizontal shank 31 is mounted in the dead space 13 and the vertical shank 32 in the transverse slot 18. In this form, as well as in the form shown in Figs. 8 and 11, it is first necessary to loosen the securing screw 6 and then tighten it to attach the bridle ring to the conduit or cable clamp.

It is obvious that should it ever be desirable to remove the different bridle rings, this can be readily done by reversing the operation described with the different forms.

Having thus described this invention in connection with illustrative embodiments thereof, to the details of which I do not desire to be limited, what is claimed as new and what is desired to secure by Letters Patent is set forth in the appended claims.

What I claim is:—

1. The combination of a conduit or cable clamp having a hook and a base, and a bridle ring having a horizontal shank supported by the hook member of the conduit or cable clamp.

2. The combination of a conduit or cable clamp having a hook and a base, and a bridle ring having a horizontal shank supported by the hook member of the conduit or cable clamp, one end of the shank being provided with a hook and the other end of the shank being provided with a reverse bend, the hook and bend engaging opposite edges of the hook member of the conduit or cable clamp.

3. The combination of a conduit or cable clamp having a hook and a base, and a bridle ring having a horizontal shank supported by the hook member of the conduit or cable clamp, and means to prevent the accidental withdrawal of the shank from the conduit or cable clamp.

4. The combination of a conduit or cable clamp having a hook and a base, and a bridle ring having a horizontal shank supported in the dead space above the hook member, and means to prevent the accidental withdrawal of the shank from said dead space.

5. The combination of a conduit or cable clamp having a base and a hook portion provided with a slot, and a bridle ring having a horizontal shank resting upon said hook portion and a vertical shank coöperating with the slot in the hook portion of the clamp.

6. The combination of a conduit or cable clamp having a base and a hook portion provided with a transverse slot, and a bridle ring having a horizontal shank resting upon said hook portion and a vertical shank coöperating with the transverse slot in the hook portion of the clamp, and means to prevent accidental withdrawal of the shank from the conduit or cable clamp.

7. A new article of manufacture comprising a bridle ring having an open ring, a horizontal shank with a downwardly extending hook at one end of the shank, and a reverse bend at the other end of the shank.

8. The combination of a conduit or cable clamp having a hook and a base, and a bridle ring having a horizontal shank, said bridle ring being partly supported by the conduit or cable clamp and partly by a securing screw securing the clamp to a wall or other support.

9. The combination of a conduit or cable clamp having a hook and a base, and a bridle ring having a horizontal shank mounted in the dead space on the hook, and provided with means to coöperate with a securing screw holding the conduit or cable clamp to a wall or other support.

10. The combination of a conduit or cable clamp having a hook and a base, and a bridle ring having a horizontal shank mounted in the dead space on the hook, said shank having a reverse bend at one end, and provided with means to coöperate with a securing screw holding the conduit or cable clamp to a wall or other support.

11. The combination of a conduit or cable clamp having a hook and a base, and a bridle ring having a horizontal shank mounted in the dead space on the hook, and provided with a bend to coöperate with a securing screw holding the conduit or cable clamp to a wall or other support.

12. The combination of a conduit or cable clamp having a base and a hook provided with a transverse slot, and a bridle ring having a horizontal shank mounted in the dead space on the hook, a vertical shank to fit into the slot in the hook member, and means to coöperate with a securing screw holding the clamp to a wall or other suitable support.

13. A new article of manufacture comprising a conduit or cable clamp having a base and a hook, the hook being provided with a transverse slot to receive the vertical shank of a bridle ring.

14. A new article of manufacture comprising a bridle ring having a horizontal shank, an open ring, a reverse bend and means to coöperate with a securing screw.

15. The combination of a conduit or cable clamp having a hook and a base, and a bridle ring having a horizontal shank supported by the hook member of the conduit or cable clamp, the end of the shank being provided with a hook to engage the side of the hook member of the clamp.

HENRY B. NEWHALL.

Witnesses:
A. M. WILLIAMS,
M. R. RYAN.